United States Patent
Lowery

(12) 
(10) Patent No.: US 6,574,879 B1
(45) Date of Patent: Jun. 10, 2003

(54) APPARATUS AND METHOD TO MEASURE AND ALIGN AIRCRAFT SEAT BACK POSITIONING

(75) Inventor: Gordon G. Lowery, Hominy, OK (US)

(73) Assignee: American Airlines, Inc., Dallas, TX (US)

( * ) Notice: Subject to any disclaimer, the term of this patent is extended or adjusted under 35 U.S.C. 154(b) by 0 days.

(21) Appl. No.: 09/872,529

(22) Filed: Jun. 1, 2001

(51) Int. Cl.[7] .............. G01B 3/14; G01B 3/34; B43L 7/10
(52) U.S. Cl. .......... 33/465; 33/485; 33/679.1; 33/494; 33/562; 33/645; 33/430
(58) Field of Search .......... 33/430, 452, 465, 33/484, 485, 486, 494, 679.1, 562, 645

(56) References Cited

U.S. PATENT DOCUMENTS

| | | | | |
|---|---|---|---|---|
| 213,526 A | * | 3/1879 | Otis ..................... | 33/465 |
| 226,605 A | * | 4/1880 | Emery ................. | 33/465 |
| 276,032 A | * | 4/1883 | Hamilton ............. | 33/465 |
| 303,077 A | * | 8/1884 | Umland ............... | 33/465 |
| 3,834,034 A | * | 9/1974 | Berquist .............. | 33/562 |
| 4,794,700 A | * | 1/1989 | Kessel ................ | 33/562 |
| 4,901,444 A | * | 2/1990 | Maschmeier ........ | 33/485 |
| 5,228,226 A | * | 7/1993 | Porosky .............. | 33/485 |
| 5,367,783 A | * | 11/1994 | Nygren ............... | 33/562 |
| 5,937,531 A | * | 8/1999 | Menk et al. ......... | 33/645 |
| 6,148,531 A | * | 11/2000 | Economaki .......... | 33/465 |

FOREIGN PATENT DOCUMENTS

FR 2640550 A1 * 6/1990 .............. 33/485

* cited by examiner

Primary Examiner—Diego Gutierrez
Assistant Examiner—Travis Reis
(74) Attorney, Agent, or Firm—Head, Johnson and Kachigian

(57) ABSTRACT

An apparatus and method to measure, establish and implement a desired range of travel allowed a reclining seat back portion of an airline seating accommodation. The invention, utilizing one or more base unit positioning templates is abutted to one or more seating accommodation foot structures to provide for accurate measurement positioning. A measurement bar restriction component is adjustably positioned to indicate a desired maximum reline position for said seat back portion, and a pivotally attached measurement bar is raised perpendicularly therefrom to a vertical orientation. Said raised measurement bar's uppermost end providing a reference point against which said seat back portion's initial contact indicates a maximum reclined position.

14 Claims, 5 Drawing Sheets

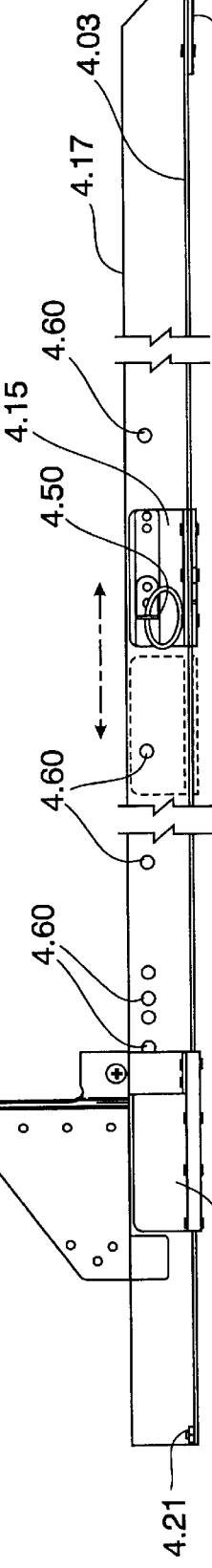
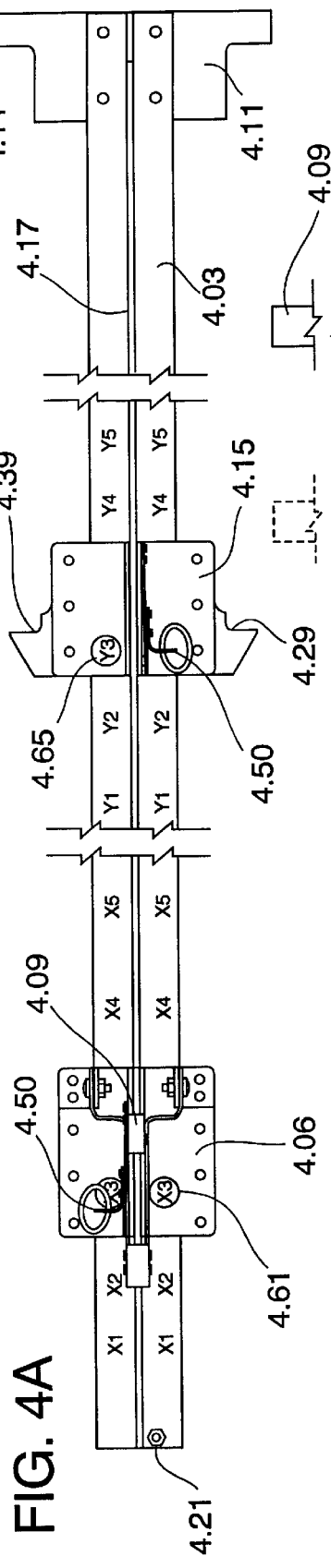
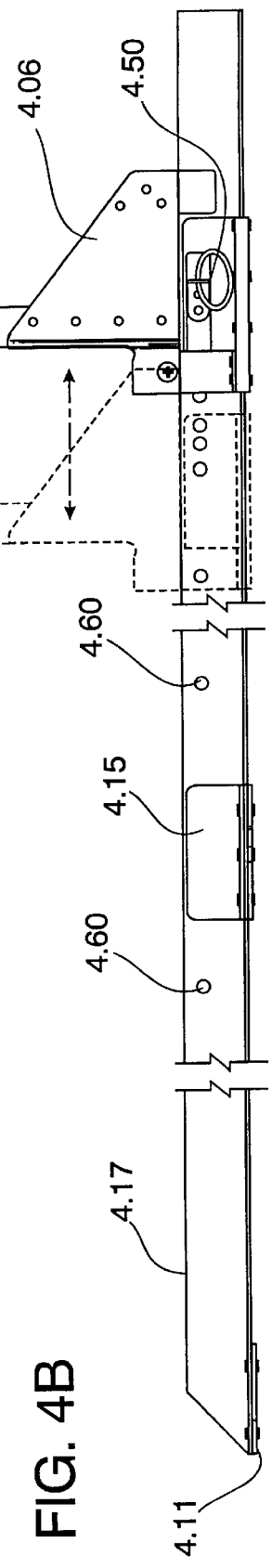
FIG. 4
FIG. 4A
FIG. 4B

APPARATUS AND METHOD TO MEASURE AND ALIGN AIRCRAFT SEAT BACK POSITIONING

REFERENCE TO PENDING APPLICATIONS

This application is not related to any pending applications.

REFERENCE TO MICROFICHE APPENDIX

This application is not referenced in any microfiche appendix.

TECHNICAL FIELD OF THE INVENTION

In general, the present invention is directed to aircraft seat positioning. In particular, the present invention is directed to an apparatus and method to measure, establish and implement a desired range of reclining travel allowed a seat back portion of an airline seating accommodation.

BACKGROUND OF THE INVENTION

Aircraft seating accommodations (a.k.a. aircraft seats) within commercial aircraft constantly require adjustment to provide for the ongoing comfort and safety of passengers. Of particular note are mandated requirements that aircraft seat back portions do not recline beyond an optimal unit of measure as determined by the Federal Aviation Authority ("FAA") to ensure passenger safety in flight and during emergency evacuation. Through normal use and wear, aircraft seat backs periodically require adjustment to ensure the extent of reclining travel falls within a desired limit. In the recent past, the Applicant has undertaken successful marketing initiatives whereby entire aircraft seating configurations have been replaced with configurations providing increased spacing between seating accommodation rows. Routine maintenance and FAA inspection require that aircraft seat recline limits be verified as to their functionality and accuracy. Indeed, as an aircraft ages, maintenance practice during what is known as "heavy C checks" calls for the removal of all aircraft seating accommodations, inspection of the seating and aircraft attachment structures prior to reinstalling the removed seats. Such operations require that the aircraft seats first be installed and seat back reclines measured by a pair of mechanics and then verified by two or more oversight agency personnel.

The current practice for verifying that the reclining portion of an airline seat accommodation falls within specifications is to first ensure the airliner is placed or otherwise positioned in level orientation. An aircraft mechanic, typically following specifications provided by an engineer, then measures the specification defining the farthest most point of rearward travel for an aircraft seat back in its reclined position. A second mechanic then reclines the aircraft seat back and using a plumb and plumb line reclines the seat back portion until the plumb line indicates it is in perfect alignment with the measurement designated by the engineer, and indicated on the aircraft floor by the first mechanic. Once so measured, adjustments common to aircraft seating accommodations which are well known and practiced by those in the field are manipulated to fix the allowable range of travel for the aircraft seat back to that communicated to the mechanic team by the engineer. It should be noted that various seats within an aircraft require varying degrees of travel for a seat back, and each and every seat back must be measured to exact specifications.and adjusted in accordance thereto. Having once adjusted an entire aircraft's seating configuration (which typically varies anywhere from 90–450 seats depending on the aircraft model) a team of oversight officials, typically FFA officials, enter the aircraft and using the afore noted measurement scenario verify adjustment of each and every seat back's travel is within allowed specification.

The instant invention advances the art by providing a method and apparatus which reduces the time necessary to measure, establish and implement a desired range of reclining seat travel for a seat back portion of an airline seating accommodation. Practicing the art of the instant invention's method and apparatus and given extensive testing, it is estimated that aggregate savings between 1 and 2 minutes per seat adjustment can be realized via practice of the instant invention. Consequently, a time savings for a 150 seat aircraft when adjusting said aircraft seat backs would fall between 2½ to 5 hours, a 300 seat aircraft would fall between 5 to 10 hours, and a 400 plus aircraft would fall between 7–14 hours. Such time savings represent substantial cost savings to an airline.

Consequently by using the instant invention and returning aircraft to service, anywhere from 2.5 to 14 hours earlier than would be realized under present art seat back measurement practices, significant cost savings may be realized throughout airline industry.

BRIEF SUMMARY OF THE INVENTION

The present invention provides for an improved method and apparatus for greatly improving upon present art practices relied upon to adjust/restrict airline seating accommodation seat back travel. Such improvement is afforded by the instant invention's teachings of an apparatus and method to measure, establish and implement a desired of range of reclining travel allowed a seat back portion of an airline seating accommodation. The invention, utilizing one or more base unit positioning templates is abutted to one or more seating accommodation foot structures to provide for accurate measurement positioning. A measurement bar restriction component is adjustably positioned to indicate a desired maximum reline position for said seat back portion, and a pivotally attached measurement bar is raised perpendicularly therefrom to a vertical orientation. Said raised measurement bar's uppermost end providing a reference point against which said seat back portion's initial contact indicates a maximum desired reclined position.

Consequently, it is an object of the instant invention to reduce the amount of time necessary to measure, establish and implement a desired range of aircraft seat back travel.

Another object of the instant invention is to verify and maintain reclining seat back travel requirements throughout an aircraft, irrespective of seat location.

A further object of the instant invention is to reduce labor requirements associated with measuring, establishing and implementing a desired range of aircraft seat back travel.

Yet another object of the instant invention is to reduce oversight agency labor requirements associated with verifying a desired range of aircraft seat back travel.

An additional object of the instant invention is to repeatedly provide for an accurate measure of desired seat back positioning.

A further object of the instant invention is to accommodate, measure, establish and implement a desired range of aircraft seat back travel, irrespective of aircraft type or seat manufacturer.

Yet another object of the instant invention is to advance the art by eliminating any requirement that an aircraft be situated on a level surface prior to measuring, establishing and implementing a desired range of aircraft seat back travel.

Other objects and further scope of the applicability of the present invention will become apparent from the detailed description to follow, taken in conjunction with the accompanying drawings wherein like parts are designated by like reference numerals.

DESCRIPTION OF THE DRAWINGS

FIGS. 1 and 1A illustrate side and top views of the invention's apparatus as practiced in its preferred embodiment.

FIGS. 4, 4A and 4B provide right, top and left perspective views of the invention wherein additional structural details may be observed.

DETAILED DESCRIPTION OF THE PREFERRED EMBODIMENT

While the making and using of various embodiments of the present invention are discussed in detail below, it should be appreciated that the present invention provides for inventive concepts capable of being embodied in a variety of specific contexts. The specific embodiments discussed herein are merely illustrative of specific manners in which to make and use the invention and are not to be interpreted as limiting the scope of the instant invention.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is intended.

While the invention has been described with a certain degree of particularity, it is clear that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

Figure 1:
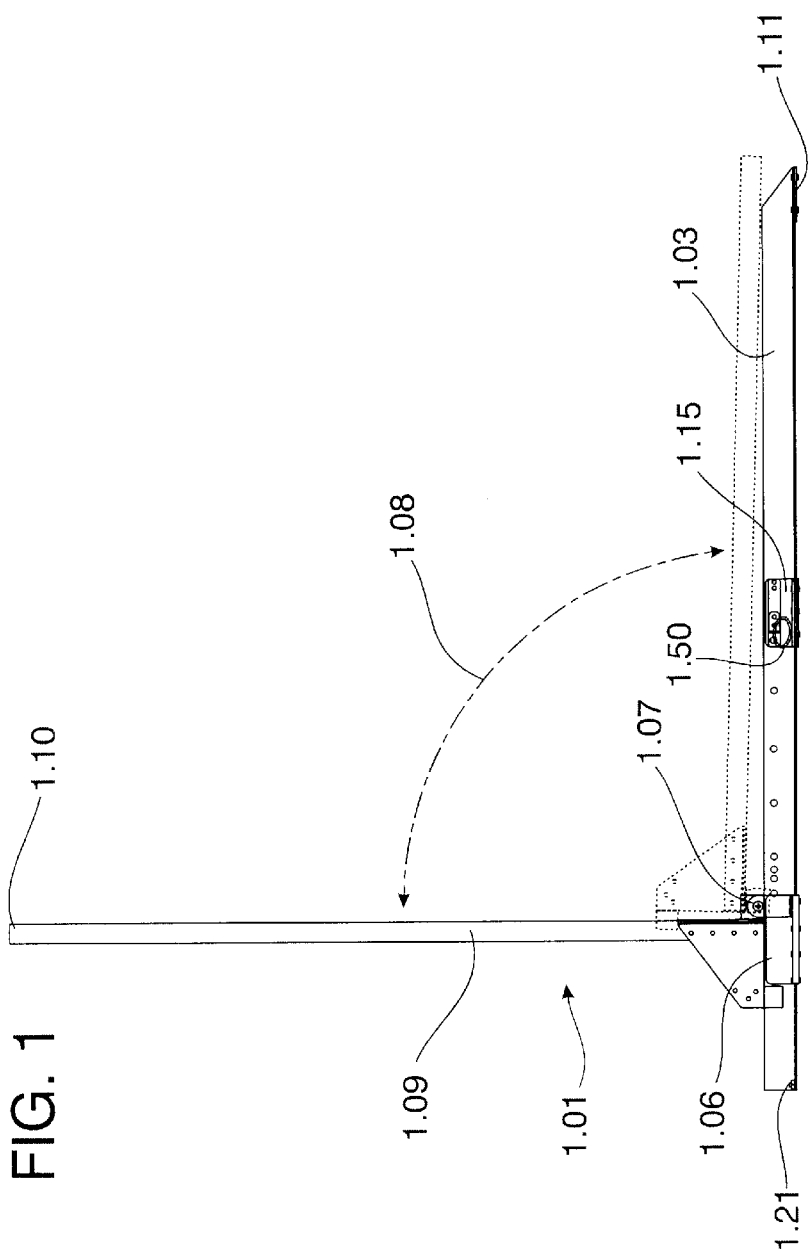

FIGS. 1 and 1A illustrate side and top views of the invention's apparatus 1.01 when practiced in its preferred embodiment. As can be seen in FIG. 1, a recline measurement bar 1.09 is pivotally attached to a recline measurement bar restriction unit 1.06 at juncture 1.07. When said bar 1.09 is fixed in its upright position, its uppermost point 1.10 is used to denote the rearmost allowable position of an aircraft seat back's travel as will be explained further in conjunction with FIGS. 2 and 3. The measurement bar 1.09 by virtue of its pivotal travel 1.08 folds downward to rest upon, or be in close proximity to, the invention's base component 1.03. The invention's base component 1.03 has attached to it a first unit positioning template 1.11, Also attached, in an adjustable/slidable manner to the base component 1.03 is a second base unit positioning template 1.15. The second base template 1.15 is slidably affixed to said base component 1.03 via a track structure 1.17 which allows said second base unit positioning template 1.15 to be variably located between the invention's first base positioning unit template 1. 11 and the invention's recline measurement bar restriction unit 1.06. To position and fix the second base unit positioning template 1.15 along said indicated range of travel, the track structure of base unit 1.03 contains at least one aperture through which a positioning pin, bolt or other similarly intended structure 1.50 may be inserted. Similarly the invention's recline measurement bar restriction unit 1.06 is allowed a range of travel along said track structure 1.17. Restriction unit 1.06 may include aperture 1.20 through which measurement units along track 1.17 or base unit 1.03 may be viewed. Also in a similar manner, the restriction unit 1.06 may be fixed in position along the track structure 1.17 via insertion of the bolt or pin 1.50 through the restriction unit body and track structure 1.17. Said range of travel accorded to the measurement bar restriction unit 1.06 is that generally along a horizontal plane bounded on one side by said second variably located second base unit positioning template 1.15 and a travel stopping device 1.21.

A patterned accommodation (a.k.a. "cut-out") 1.13 further defines the template structure and allows for abutting of said template along a first aircraft seating accommodation foot component. In a similar manner, a patterned accommodation 1.29 of a second base unit positioning template 1.15 allows for the abutting of said second template 1.15 against a second aircraft seating accommodation foot component. Upon positioning said first and second templates 1.11, 1.15 against said foot components and having further inserted a pin positioning device 1.50 through the track structure 1.17 of the invention's base component 1.03, the invention is securely positioned for seat back measurement purposes. To effectuate such measurement the invention's recline measurement bar restriction unit 1.06 is moved to a measured and delineated location along said track structure 1.17, whereupon its vertically erected recline measurement bar 1.09 denotes the farthest most rear movement of a seat back portion.

Figure 2:
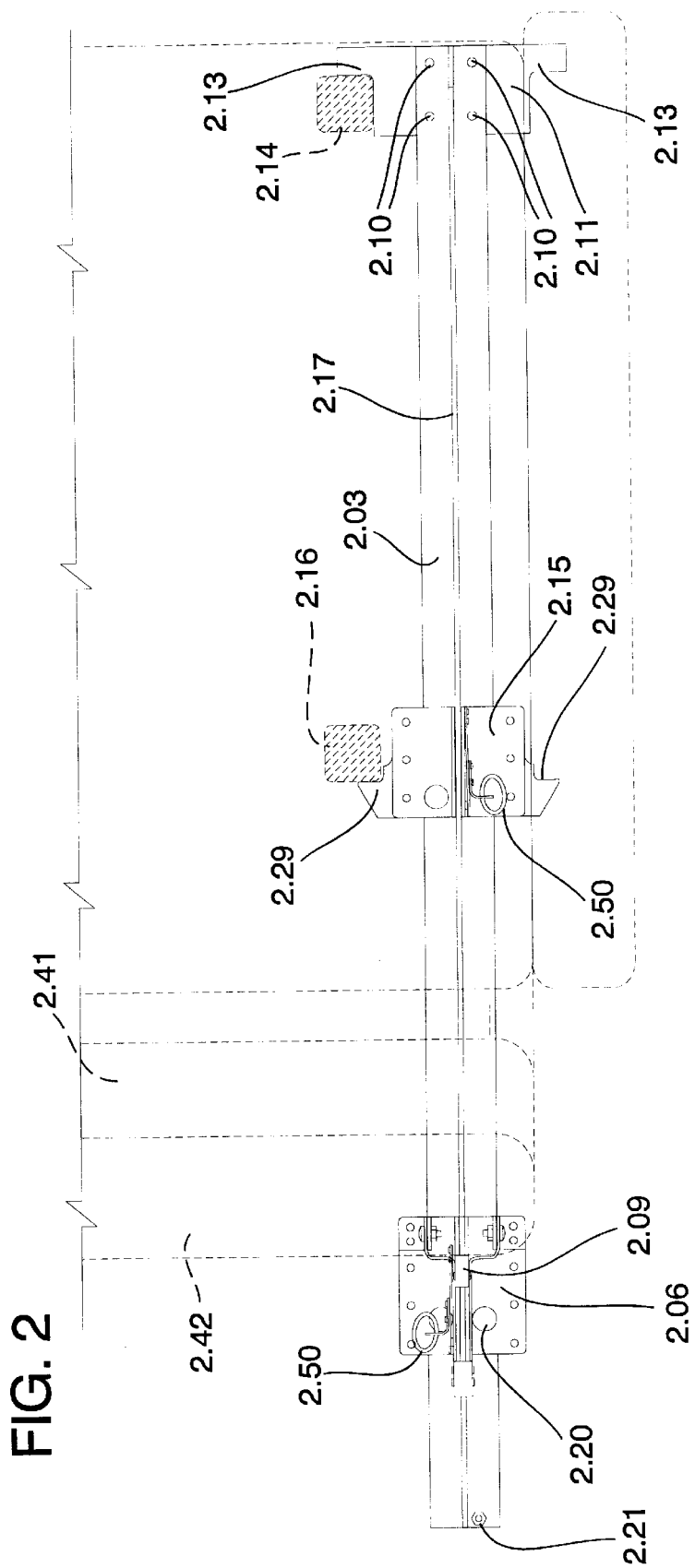
FIG. 2 is a top view illustration providing further detail with respect to the invention's first and second base unit positioning templates, recline measurement bar restriction unit, first and second base unit template accommodations securely abutting first and second aircraft seating components and first and second seat back positions when practicing the invention in its preferred embodiment.

FIG. 2 provides greater detail with respect to the invention's recline measurement bar restriction unit 1.06 and first and second base unit positioning templates 1.11, 1.15 which securely abut first and second aircraft seating accommodation foot components and first and second seat back positions as practiced in the invention's preferred embodiment. Turning now to FIG. 2.

Figure 3:
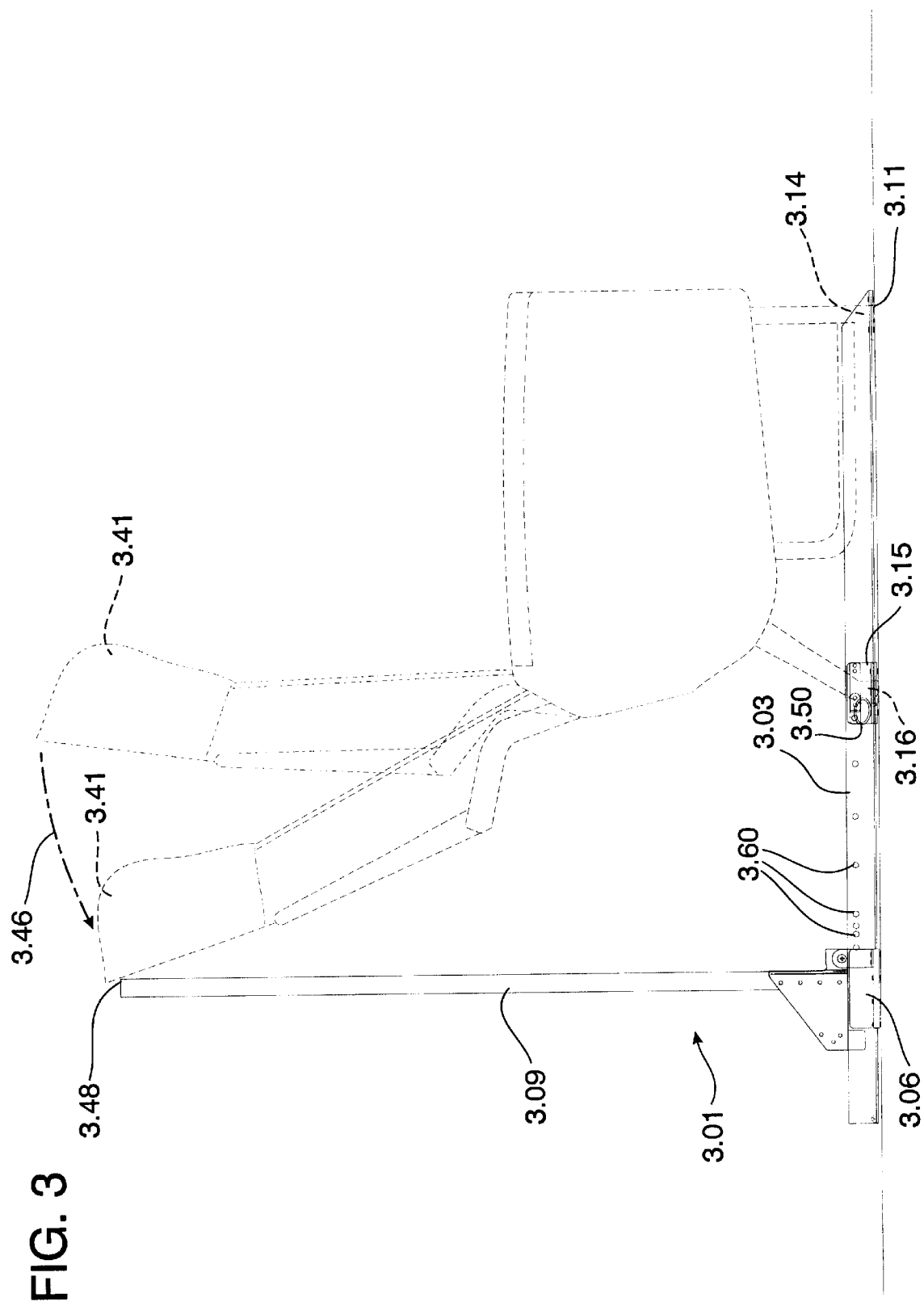
FIG. 3 is a side view illustration which provides further detail with respect to an aircraft seat back range of motion as restricted by the invention's pivotally attached measurement bar, and further details apparatus base component apertures through which a positioning pin may be inserted to fix in place the invention's adjustable recline measurement bar restricting unit and second base unit positioning template.

In FIG. 2 the normal vertical position of an airline seat back is denoted as position 2.41 with said seat back in its intended recline position indicated as position 2.42. A first base unit positioning template 2.11 is shown permanently affixed in a non-adjustable/non-slidable manner to a first end of the invention's base component 2.03 via rivets, bolts, Hilok and other similarly intended structures 2.10 to permanently position said first positioning template 2.11. A patterned accommodation (a.k.a. "cut-out") 2.13 further defines the template structure and allows for abutting of said template along a first aircraft seating accommodation foot component 2.14. In a similar manner, a patterned accommodation 2.29 of a second base unit positioning template 2.15 allows for the abutting of said second template 2.15 against a second aircraft seating accommodation foot component 2.16. Upon positioning said first and second templates 2.11, 2.15 against said foot components 2.14 2.16 and having further inserted a pin positioning device 2.50 through the track structure 2.17 of the invention's base component 2.03, the invention is securely positioned for seat back measurement purposes. To effectuate such measurement the invention's recline measurement bar restriction unit 2.06 is moved to a measured and delineated location along said track structure 2.17, whereupon its vertically erected recline measurement bar 2.09 denotes the farthest most rear movement of said seat back portion 2.42. The range of travel accorded to the measurement bar restriction unit 2.06 is that generally along a horizontal plane bounded on one side by said second variably located second base unit positioning template 2.15 and a travel stopping device 2.21. Restriction unit 2.06 may include aperture 2.20 through which measurement units on track 2.17 or base 2.03 may be viewed. FIG. 3 further illustrates the placement of said measurement bar 2.09 to effectuate this measurement. Turning now to FIG. 3.

In FIG. 3 it can be seen where the measurement bar 3.09 of seat positioning apparatus 3.01 has been vertically raised to indicate the rearmost travel of seat back 3.41. Said range of allowable travel denoted as 3.46 with a point of contact between said seat back portion 3.41 and measurement bar 3.09 denoted as point 3.48. Measurement point 3.48 is thus presented having once ascertained the maximum allowable reclined travel for seat back 3.41, and secured the invention's recline measurement bar restriction unit 3.06 at a point along the invention's base unit track 3.03 to provide for said point of contact. The measurement bar restriction unit 3.06 is fixed in this predefined location via the insertion of pin, bolt or other similarly intended structure as discussed earlier in accordance with FIGS. 1, 1A and 2 through one or more of holes 3.60. FIG. 3 further illustrates a side view positioning of a first aircraft seating accommodation foot component 3.14 and second aircraft seating accommodation foot component 3.16 having positioned the invention's first positioning template 3.11 and second positioning template 3.15 to allow for the abutting of said templates via pattern accommodations as discussed in association with FIG. 2. As with the disclosures of FIGS. 1 and 2, second positioning template 3.15 is secured to track of base unit 3.03 by a bolt, nut or similarly intended structure 3.50.

FIGS. 4, 4A and 4B provide right, top and left perspective views of the invention wherein additional structural details may be observed. Turning now to FIGS. 4, 4A and 4B.

In FIGS. 4, 4A and 4B apertures 4.60 through track 4.17 of base unit 4.03 which a positioning pin 4.50 may be inserted into one of holes 4.60 of track 4.17 to fix and position second base unit positioning template 4.15 and recline measurement bar restriction unit 4.06 may be best observed. The range of travel accorded to the measurement bar restriction unit 4.06 is that generally along a horizontal plane bounded on one side by said second variably located second base unit positioning template 4.15 and a travel stopping device 4.21. Said variable travel of the invention's recline measurement bar restriction unit 4.06 provides for fixed positioning of recline measurement bar 4.09 and is best illustrated in FIG. 4B. Travel of said second base unit positioning template 4,15 may be best observed in FIG. 4. FIG. 4A provides additional detail through which at least one aperture 4.61 in said recline measurement bar restriction unit 4.06 a positioning indicator may be viewed to position said measurement bar restriction unit 4.06, said indicators referenced as X1 through X5 in FIG. 4A. Similarly the invention's second base unit positioning template 4.15 contains at least one aperture 4.65 through which its position may be fixed to accommodate the proper abutting of a second airline seat foot component into an applicable patterned accommodation 4.29 or 4.39. Said positioning indicators referenced as Y1 through Y5 in FIG. 4A. In practice and through extensive testing it has been found that the most effective means to position said restriction unit 4.06 and second base unit positioning template 4.15 is to provide such units with apertures on either side of the invention's track structure 4.17 with positioning indicators similarly duplicated to allow for easy reading and positioning from either side of the invention's track 4.17. Also illustrated in FIGS. 4, 4A and 4B is first positioning template 4.11 which is permanently affixed to base unit 4.03 such that, unlike second positioning unit 4.15 and recline measurement bar restriction unit 4.06, it may not move along track 4.17.

Figure 5:
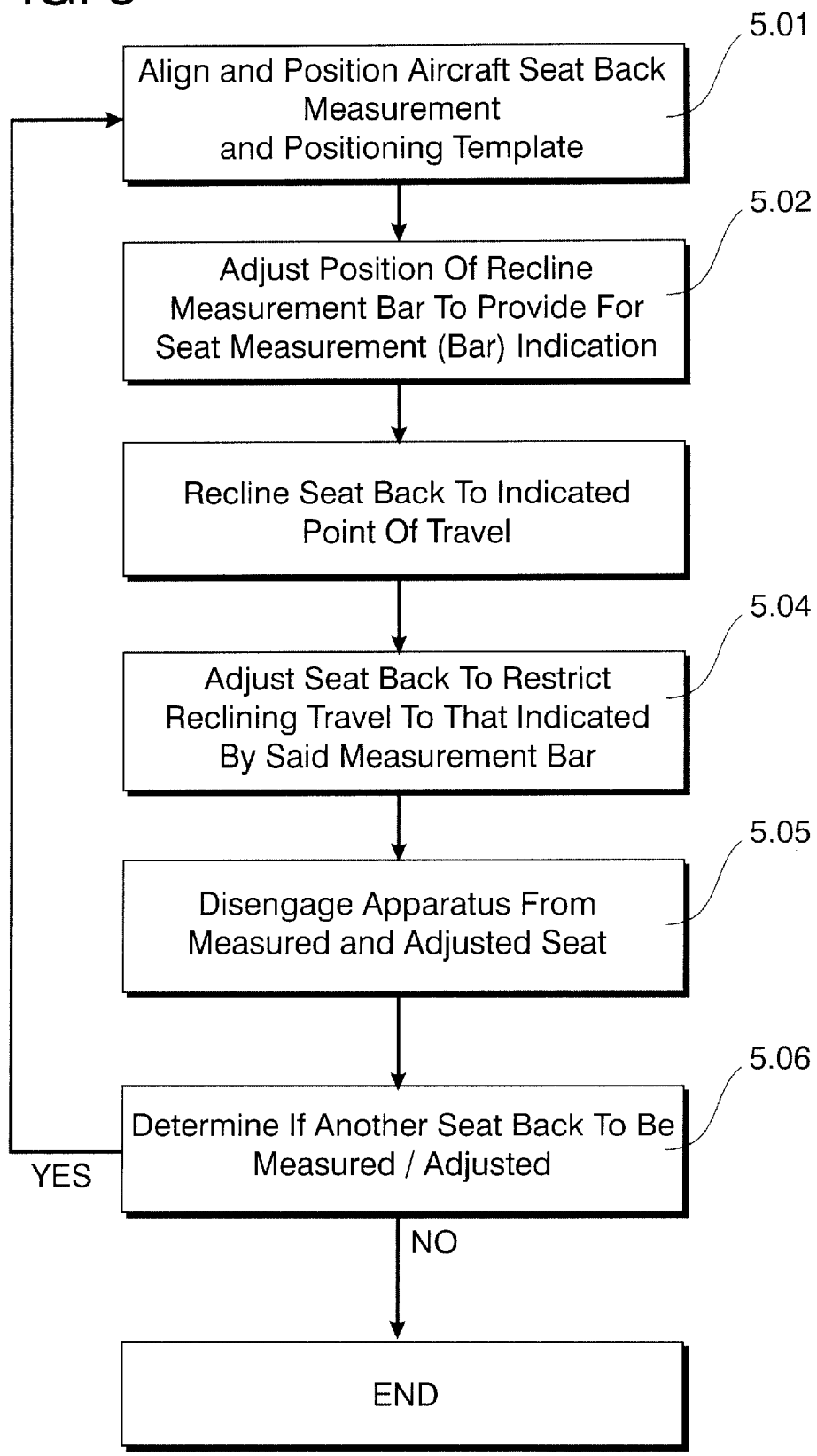
FIG. 5 illustrates method sequence steps by which the invention's practice may be effectuated.

FIG. 5 illustrates a non-limiting method sequence by which the invention's practice may be effectuated. The invention is first practiced by aligning an aircraft seat back measurement and positioning apparatus with an aircraft seating accommodation 5.01. In so doing the invention is practiced by first positioning its first and second base unit positioning template securely against first and second aircraft accommodation seating foot components. Once the invention first and second templates have been securely abutted against first and second aircraft seating accommodation foot components, an allowable range of travel for the seat back portion of an aircraft seating accommodation is indicated upon the positioned apparatus. To accomplish this objective, the recline measurement bar restriction unit may be adjustably positioned along the invention's track structure whereupon the vertical positioning of the invention's measurement bar indicates a rearmost point of travel for an aircraft back seating accommodation 5.02. Via adjustment means well known to those skilled in the art, adjustments are then made to the seat back portion of the seating accommodation to restrict its rearmost travel to be within the bounds established by said erected measurement bar 5.04.

Having once completed the measurement of the first airline seat back accommodation the invention is disengaged by releasing or otherwise moving the invention's second base positioning unit component to allow disengagement of the invention from said first and second aircraft seating accommodation foot structures 5.05. The invention's practice is then repeated for each seat within the aircraft until all required seat back travel adjustments have been made and/or verified 5.06.

While this invention has been described to illustrative embodiments, this description is not to be construed in a limiting sense. Various modifications and combinations of the illustrative embodiments as well as other embodiments will be apparent to those skilled in the art upon referencing this disclosure. It is therefore intended that this disclosure encompass any such modifications or embodiments.

What is claimed is:

1. An aircraft seat back measurement and positioning apparatus comprising:
   an apparatus base component;
   a recline measurement bar restriction unit adjustably attached to said base component;

a recline measurement bar pivotally attached to said restriction unit; and at least one base unit positioning template attached to said apparatus base component, said apparatus base unit positioning template comprising at least one accommodation patterned and securely abutted to a first aircraft seating accommodation foot component (pattern, stencil, template).

2. The apparatus of claim 1 wherein said apparatus base component further comprises a plurality of measurement positioning indicators.

3. The apparatus of claim 1 wherein said apparatus base component further comprises at least one aperture through which a positioning pin may be inserted to position said recline measurement bar restriction unit.

4. The apparatus of claim 1 wherein said base unit positioning template is permanently, fixedly attached to a first end of said apparatus base component.

5. The apparatus of claim 1 wherein said base component further comprises a second base unit positioning template, said second positioning template adjustably attached to said apparatus base component and variably located between said first base unit positioning template and said recline measurement bar restriction unit.

6. The apparatus of claims 1 or 5 wherein said apparatus base component further comprises a plurality of apertures through which a positioning pin may be inserted to fix the position of said recline measurement bar restriction unit and said second positioning template.

7. The apparatus of claim 5 wherein said second positioning unit further comprises at least one aperture through which a positioning indicator may be observed.

8. The apparatus of claim 5 wherein said second positioning unit further comprises at least one accommodation patterned to securely abut a second aircraft seating accommodation foot component.

9. The apparatus of claim 1 wherein said recline measurement bar restriction unit further comprises at least one aperture through which a positioning indicator may be observed.

10. An aircraft seat back measurement and positioning apparatus comprising:

an apparatus base component;

a recline measurement bar restriction unit adjustably attached to said base component;

a recline measurement bar pivotally attached to said restriction unit;

a first base unit positioning template permanently, fixedly attached to a first end of said base component comprising an accommodation patterned and securely abutted to a first aircraft seating accommodation foot component;

a second base unit positioning template adjustably attached to said apparatus base component and variably located between said first base unit positioning template and said recline measurement bar restriction unit.

11. The apparatus of claim 10 wherein said second positioning unit further comprises an accommodation patterned to securely abut a second aircraft seating accommodation foot component.

12. The apparatus of claim 10 wherein said apparatus base component further comprises a plurality of measurement positioning indicators.

13. The apparatus of claim 10 wherein said recline measurement bar restriction unit further comprises at least one aperture through which a positioning indicator may be observed.

14. The apparatus of claim 10 wherein said second positioning unit further comprises at least one aperture through which a positioning indicator may be observed.

* * * * *